May 5, 1931.   J. H. METCALF   1,804,224
PLASTIC MODELING MACHINE
Filed Nov. 19, 1928   2 Sheets-Sheet 1

Inventor
Jay H. Metcalf
By Liverance and
Van Antwerp
Attorneys

Patented May 5, 1931

1,804,224

UNITED STATES PATENT OFFICE

JAY H. METCALF, OF GRAND RAPIDS, MICHIGAN

PLASTIC MODELING MACHINE

Application filed November 19, 1928. Serial No. 320,371.

This invention relates to a plastic modeling machine which is of particular utility in the treatment of faces of bodies in preparing them for burial, though there are other places of usefulness of the machine, as in shaping and modeling the features of patients so as to have both sides of the face correspond.

In many instances, due either to disease or accident, it is desirable to repair and disguise the faces of bodies in preparation for burial. With the machine which I have invented, this is accomplished very satisfactorily and both sides of the face can be made symmetrical and the body prepared to present a better appearance through the use of modeling wax which can be applied and shaped and modeled at one side of the face so as to correspond completely to the other.

The construction of mechanism which I have devised for this purpose is fully described in the following description and may be understood in connection with the accompanying drawings, in which, Fig. 1 is a side elevation of the machine with parts being broken away for a better disclosure.

Like reference characters refer to like parts in the different figures of the drawings.

Figure 1:
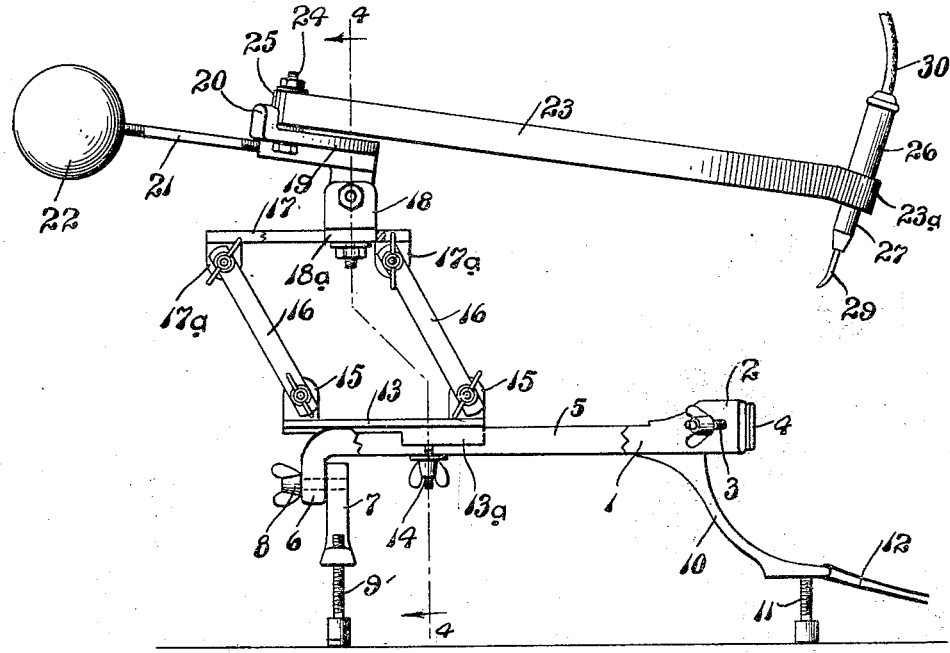
Figure 2:
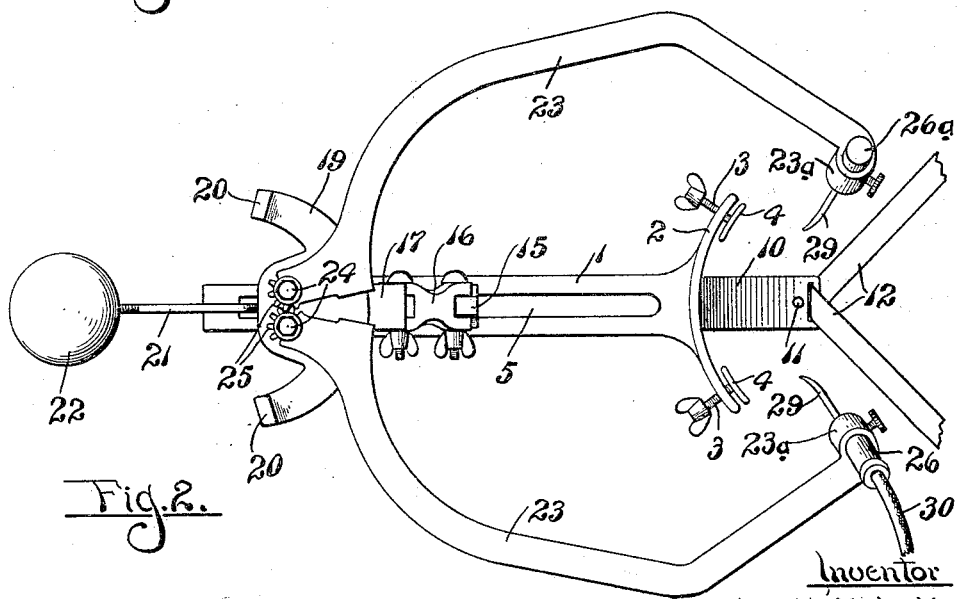
Fig. 2 is a plan view thereof.

In the construction of the machine a substantially horizontal supporting bar 1 is provided which, at its front end, is formed with an arc shaped head 2 having adjusting screws 3 passing therethrough adjacent the opposite ends of the head, equipped at their inner ends with bearing plates 4 of curved shape. The bar 1 is vertically slotted for the greater portion of its length, making the elongated slot 5, and at its inner end has a downturned lug 6. A foot carrying member 7 having diverging downwardly extending legs is pivotally connected to the lug 6, use being made of a bolt extending through said lug to receive a clamping nut, as indicated at 8, whereby the member 7 may be adjusted to and held in different positions. Feet at the lower end of screws 9 threading upwardly through the legs of the member 7 permit a change in position of the structure through the adjustment of the screws 9, as is evident.

Figure 3:
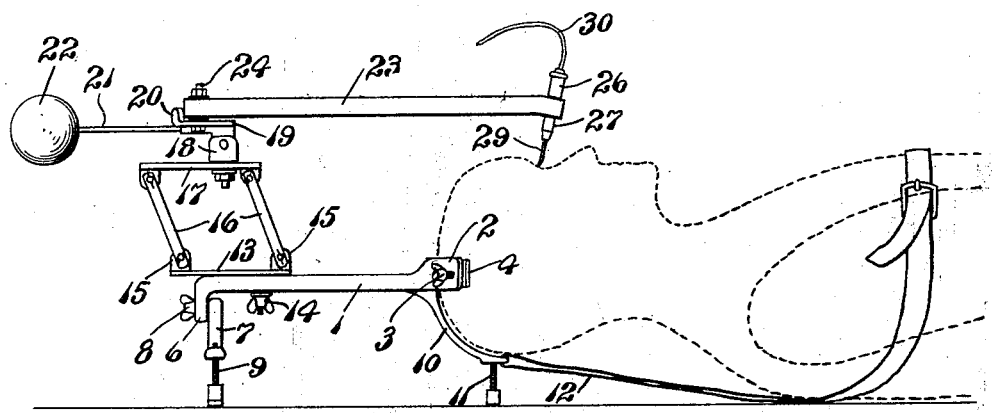
Fig. 3 is a side elevation in somewhat reduced size illustrating the manner of using the same.
Figure 4:
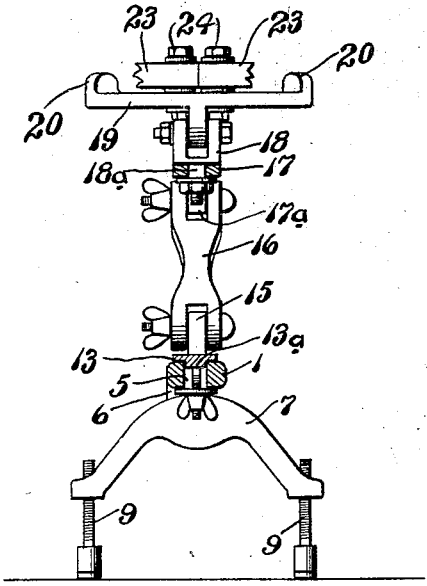
Fig. 4 is a vertical section substantially on the plane of line 4—4 of Fig. 1, looking in the direction indicated by the arrows, and, Fig. 5 is a fragmentary enlarged elevation and vertical section showing the modeling tool which is carried by one arm of the machine.
Figure 5:
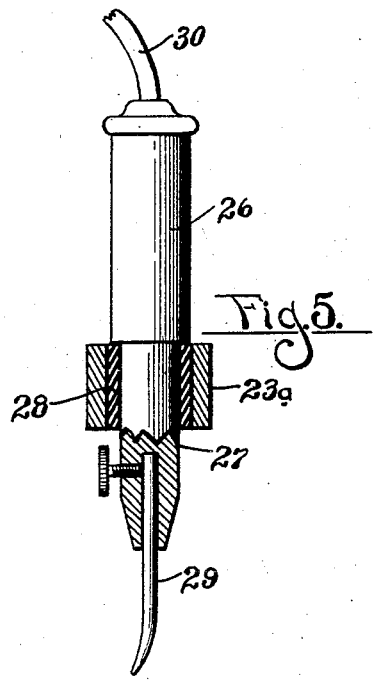

At the front end of the bar 1 and at its under side, it is provided with a downwardly and forwardly curved foot member 10 through which a screw 11 passes having a foot at its lower end similar to the lower ends of the screws 9. The front end of the member 10 is slotted and a strap 12 passes therethrough adapted to extend forward under the arms of the body so as to hold the same securely with relation to the part 2, the clamping plates 4 being adjusted against the head of the body, as indicated in Fig. 3.

The bar 13 is located above the bar 1 having a tongue 13a adjacent its front end and at its lower side which is received in the slot 5. A screw extends from the tongue 13a thru the slot and has a clamping nut 14 at its lower end whereby the bar 13 may be adjusted to different positions in the length of the bar 1 and clamped in any position to which adjusted. Ears 15 extend upwardly from opposite ends of bar 13 to which links 16 are pivotally connected at their lower ends. The pivots used are bolts with wing nuts which may be tightened or loosened as desired and, when a desired position is reached, tightened to hold the links against movement with respect to the base bar 13. An upper bar 17 has depending ears 17a at each end to which the upper ends of the links 16 are pivotally connected in like manner.

The upper bar 17 is slotted lengthwise. A U-shaped stirrup member 18 is located above and over the bar 17 having a tongue 18a at its lower side passing into said slot. The member 18 is secured to bar 17 by a bolt and nut connection, as illustrated. Above the stirrup member 18 an arc shaped plate 19 having oppositely extending arms terminating in upturned ears 20 is located. At the front end and lower side of the plate 19 it is equipped with a downwardly extending lug which passes between the sides of the stirrup member 18 and a bolt through said sides of the stirrup member and the lug to pivotally mount the plate 19 for turning about the horizontal axis. A rod 21 is attached to and extends to the rear from the plate 19 having a weight in the shape of a ball 22 attached to its rear end.

Two arms 23 are pivotally connected at one end, at 24, on and above the plate 19. At their rear ends they are equipped with gear teeth 25 which are in mesh so that the inward or outwardly swinging movement of either arm 23 is accompanied by a like inward or outward swinging movement of the opposite arm. The outward swinging movement is limited by the upturned ears 20 acting as stops.

The front free end of each arm 20 is equipped with a vertical collar 23a. Mounted at the end of one of said arms is a housing 26, designed to have an electric heating coil housed therein, which has a depending stem 27 passing through a heat insulating bushing 28 fixed in the collar 23a. A rod 29 is detachably connected with and extends from the lower end of the stem 27 and a cord 30 for carrying the electric circuit wires leads into the upper end of the bushing. The other arm 23 is similarly equipped except that the housing 26a is not designed to carry any heating device, though the rod 29 and its method of attachment to the depending stem 27 is the same.

It is evident that with a construction of mechanism as described, the same may be adjusted so as to bring the lower ends of the two rods 29 properly over the face of the body or patient. The rod 29 carried by the housing 26a operates as a stylus to follow a pattern and when brought in contact with a side of the face causes the lower end of the other member 29 to follow exactly the same path of movement that it follows. Any injury, wastage of tissues, or the like, which results in a hollow or cavity in the face or otherwise may be filled with a plastic material which can be readily shaped by the heated member 29. The material used is a wax which will melt in contact with the point of the heated rod 29. One side of the face, that which is uninjured, serves as a pattern for building up the opposite side. Then by properly tinting or coloring the surface of the wax which has been used to fill the hollows or recesses the appearance is in a large measure restored. If both sides of the face are injured and need to be built up in this manner, one side can be built without reference to the other and then the other side reproduced properly to correspond with the first.

It is evident that the mechanism described is particularly practical for the purpose for which it is designed. The links 16 are first adjusted to a desired angle so as to lift the arms 23 and the devices carried at the free ends thereof to the proper height. The stirrup 18 is slidable back and forth lengthwise of the bar 17 so that the lower ends of the rods 29 may be brought to any desired position. The weight 22 counterbalances the weight of the arms 23. The gearing connection between the rear ends of arms 23 insures like movements of the arms. The various adjustments with regard to the supporting feet and the screws 9 and 11 associated therewith permit a tilting of the mechanism to one side or the other, which is desirable in many cases when the body has to be turned to one side. The construction has proved very practical and efficient. The claims appended hereto define the invention which is to be considered comprehensive of all forms of structure coming within their scope.

I claim:

1. In a machine of the class described, a substantially horizontal bar, a plate mounted for adjustment above and lengthwise of said bar, parallel links pivoted to and extending upwardly from the plate, a second slotted bar pivotally connected to the upper end of the links, means for securing the links, bar and plate in fixed relation to each other after adjustment to any desired position, a member slidably mounted on said second bar, a supporting plate pivotally mounted on said member to turn about a horizontal axis, arms pivotally mounted at one end on the supporting plate, operative connections between the arms for causing simultaneous equal movement of one arm with the other, a stylus attached to and depending from the free end of one of the arms, a modeling tool attached to and depending from the free end of the other arm, and means on the first bar for holding the head of a body in secure relation thereto.

2. A construction containing the elements in combination defined in claim 1, combined with a foot member having diverging legs pivotally connected to the first bar near one end to turn about a horizontal axis, adjusting screws threaded through the ends of said legs, each of said screws having a foot at its lower end, and a like screw equipped with a foot at its lower end mounted near the opposite end of said first bar.

3. In a construction of the class described, a support having front and rear ends, means at the front end of the support for securing the head of the body in fixed relation thereto, means mounted on said support for adjustment backward and forward thereon and for securing the same in any position to which adjusted, a tiltably mounted plate carried on said means adapted to be tilted about a horizontal axis, means for mounting said plate for sliding movement backward and forward, a pair of arms geared together at their rear ends each pivotally mounted at its rear end on said plate, a depending stylus for following the pattern of one side of the face of said head attached to the free end of one of said arms, and a modeling tool having like form as the stylus attached to and depending from the free end of the other arm.

4. In a construction of the class described, a horizontal longitudinally slotted supporting bar having front and rear ends and an arc shaped head at its front end, adjusting screws threaded thru the end portions of said head, plates at the ends of the adjusting screws, a member attached at the front end of and below said head curving downwardly and forwardly therefrom, a strap passing through the front end of said member, a screw threaded upwardly through the end of said member having a foot at its lower end, a foot member pivotally mounted at the rear end of said support to turn about a horizontal axis having diverging legs, adjusting screws each equipped with a foot at its lower end threaded upwardly through the ends of said legs, a pair of arms pivotally mounted at their rear ends to turn about substantially vertical axes mounted on and above said support, gearing connections between the rear ends of said arms to cause like simultaneous movements of said arms, a depending stylus secured at the free end of one arm, and a modeling tool of like construction as the stylus attached to and depending from the free end of the other arm.

5. An appliance of the character described comprising a frame, holding means for securely holding the head of a body to the frame, a pair of arms pivotally mounted at one end and having free ends adapted to come above the head of said body, means for connecting said arms whereby the movements of one is accompanied by simultaneous and like movements of the other, a stylus depending from the free end of one of said arms on said frame, means for mounting said arms whereby the stylus may be moved to any desired position and contact at its lower end with one side of the face, and a modeling tool connected to and depending from the free end of said depending arm, having identical form at its lower portion with said stylus to move over the opposite side of said face of said body.

6. An appliance of the character described comprising a frame, holding means for securely holding the head of a body to the frame, a pair of arms pivotally mounted at one end to the frame, and having free ends adapted to move over the head of said body, means for connecting said arms whereby the movements of one is accompanied by simultaneous movements of the other, and a tool attached to the free end of each arm.

7. In a construction of the class described, a support having front and rear ends, means at the front ends of the support for securing the head of a body in fixed relation thereto, means mounted on said support for adjustment backward and forward thereon and for securing the same in any position to which adjusted, a tiltably mounted plate carried on said means adapted to be tilted about a horizontal axis, means for mounting said plate for sliding movement back and forward, a pair of arms pivotally mounted on said plate and having free ends extending forwardly therefrom, means associated with said arms for causing them to move simultaneously and a tool attached to the free end of each arm.

8. In a construction of the class described, a horizontal longitudinally slotted supporting bar having front and rear ends and an arc shaped head at its front end, adjusting screws threaded thru the end portions of said head, plates at the ends of the adjusting screws, a member attached at the front end of and below said head curving downwardly and forwardly therefrom, a strap passing through the end of said member having a foot at its lower end, a foot member pivotally mounted at the rear end of said support to turn about a horizontal axis having diverging legs, adjusting screws each equipped with a foot at its lower end threaded upwardly through the ends of said legs, a pair of arms pivotally mounted at their rear ends to turn about substantially vertical axes mounted on and above said support, means associated with said arms for causing them to move simultaneously and a tool attached to the free end of each arm.

9. An appliance of the character described comprising a frame, holding means for securely holding the head of a body to the frame, a pair of arms pivotally mounted at one end and having free ends adapted to come above the head of said body, means for connecting said arms whereby the movements of one is accompanied by simultaneous movements of the other, a tool attached to the free end of each arm and means for mounting said arms on said frame whereby the tools at their free ends may be moved to any desired position to contact the said head of the body.

10. An appliance of the character described comprising a frame, means for securely holding the head of a body to the frame, a slide member slidably mounted on said frame, a pair of arms pivotally mounted at one end of said slide member and having free ends adapted to move over the said head of a body, means for connecting said arms whereby movements of one is accompanied by like movements of the other, and a tool attached to the free end of each arm.

11. An appliance of the character described comprising a frame, means for securely holding the head of a body to the frame, a slide member slidably mounted on said frame, a carrier member pivotally mounted on a horizontal axis on said slide member, a pair of arms pivotally mounted at one end on said carrier member on vertical axes and having free ends adapted to move over the said head of a body, means for connecting said arms whereby movements of one is accompanied by like movements of the other, and a tool attached to the free end of each arm.

In testimony whereof I affix my signature.

JAY H. METCALF.